(12) United States Patent
Kim

(10) Patent No.: US 6,625,269 B1
(45) Date of Patent: Sep. 23, 2003

(54) METHOD OF MONITORING DIGITAL LINE SIGNAL IN PRIVATE EXCHANGE SYSTEM

(75) Inventor: Hong-Han Kim, Kyongsangbuk-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/382,683

(22) Filed: Aug. 25, 1999

(30) Foreign Application Priority Data

Aug. 26, 1998 (KR) .............................. 98-34656

(51) Int. Cl.⁷ .............................................. H04M 1/00

(52) U.S. Cl. .................. 379/156; 379/133; 379/140; 379/165

(58) Field of Search ................ 379/142.01, 142.07, 379/142.06, 142.17, 142.14, 156, 164, 165, 265.13, 266.01, 266.1, 133, 140

(56) References Cited

U.S. PATENT DOCUMENTS

| 4,577,065 | A | * | 3/1986 | Frey et al. |
| 5,519,773 | A | * | 5/1996 | Dumas et al. |
| 5,572,585 | A | * | 11/1996 | Tsutsui |
| 5,848,143 | A | | 12/1998 | Andrews et al. |
| 5,850,434 | A | * | 12/1998 | Ardon |
| 5,878,113 | A | | 3/1999 | Bhusri |
| 5,881,132 | A | | 3/1999 | O'Brien et al. |
| 5,905,785 | A | | 5/1999 | Dunn et al. |
| 5,905,792 | A | | 5/1999 | Miloslavsky |
| 5,909,480 | A | | 6/1999 | Reynaud et al. |
| 6,151,390 | A | * | 11/2000 | Volftsun et al. |

* cited by examiner

Primary Examiner—Duc Nguyen
(74) Attorney, Agent, or Firm—Robert E. Bushnell, Esq.

(57) ABSTRACT

A method of monitoring a digital line signal using a key phone in a private exchange system. A line signal constructed in a predetermined format is received by inter-processor communication (IPC) from a digital trunk upon a digital channel enable request, a display data message corresponding to the line signal is sent, and the display data message is displayed on a display of the key phone

21 Claims, 7 Drawing Sheets

METHOD OF MONITORING DIGITAL LINE SIGNAL IN PRIVATE EXCHANGE SYSTEM

CLAIM OF PRIORITY

This application makes reference to, incorporates the same herein, and claims all benefits accruing under 35 U.S.C. §119 from an application entitled METHOD OF MONITORING DIGITAL LINE SIGNAL IN PRIVATE EXCHANGE SYSTEM earlier filed in the Korean Industrial Property Office on the Aug. 26, 1998, and there duly assigned Serial No. 34656/1998, a copy of which is annexed hereto.

BACKGROUND OF THE INVENTION

1. Technical Field

The present invention relates to a signal monitoring method in a private exchange system, and more particularly, to a method of monitoring a digital line signal applied to a digital trunk in a private exchange system.

2. Related Art

A private exchange system refers to a small exchange for switching a plurality of extension terminals within the same building or the same office, including a key phone system, a private branch exchange (PBX), and a private branch automatic exchange (PBAX).

In such a private exchange system, a central office (CO) line is connected to a digital trunk to which a digital line signal is applied. In many cases, the digital line signal should be monitored in the private exchange system.

I have found that there is a need for an improved method of monitoring of a digital line signal in a private exchange system. Efforts have been made to improve communications systems and to improve a monitoring of digital signals.

Exemplars of recent efforts in the art include U.S. Pat. No. 5,909,480 for SELF-CONTAINED APPARATUS AND METHOD OF MONITORING TELECOMMUNICATIONS EQUIPMENT issued to Reynaued, et al., U.S. Pat. No. 5,905,792 for EXTERNAL POSITIVISTIC FORWARD TRANSFER IN CALL ROUTING SYSTEM issued to Miloslavsky, U.S. Pat. No. 5,905,785 for DETECTING HIGH USAGE TELECOMMUNICATIONS LINES issued to Dunn, et al., U.S. Pat. No. 5,881,132 for METHOD AND APPARATUS FOR MONITORING SELECTED TELECOMMUNICATIONS SESSIONS IN AN INTELLIGENT SWITCHED TELEPHONE NETWORK issued to O'Brien, et al., U.S. Pat. No. 5,878,113 for SERVICE AND INFORMATION MANAGEMENT SYSTEM FOR A TELECOMMUNICATIONS NETWORK issued to Bhusri, and U.S. Pat. No. 5,848,143 for COMMUNICATIONS SYSTEM USING A CENTRAL CONTROLLER TO CONTROL AT LEAST ONE NETWORK AND AGENT SYSTEM issued to Andrews, et, al.

While these recent efforts provide advantages, I note that they fail to adequately provide a method for efficiently and conveniently monitoring digital line signals in a private branch exchange.

SUMMARY OF THE INVENTION

An object of the present invention is to provide a digital line signal monitoring method which obviates the need for a separately procured line signal monitoring device.

Another object of the present invention is to provide a digital line signal monitoring method using a key phone system as an extension telephone.

To achieve the above objects, there is provided a method of monitoring a digital line signal using a key phone in a private exchange system. A line signal constructed in a predetermined format is received by inter-processor communication (IPC) from a digital trunk upon a digital channel enable request, a display data message corresponding to the line signal is sent, and the display data message is displayed on a display of the key phone.

To achieve these and other objects in accordance with the principles of the present invention, as embodied and broadly described, the present invention provides a method, comprising monitoring digital signals using a key phone in a private exchange communication system, comprising receiving a first digital signal at said private exchange communication system; when said first signal is received, constructing a second signal according to a predetermined format and then transmitting said second signal by inter-processor communication; outputting a data message to said key phone, said data message corresponding to said second signal; and displaying said data message on a display unit of said key phone.

To achieve these and other objects in accordance with the principles of the present invention, as embodied and broadly described, the present invention provides a method of monitoring a signal using a phone in a private exchange system, comprising: sending by inter-processor communication a signal constructed in a predetermined format in response to a digital channel enable request; receiving said signal by inter-processor communication, said signal corresponding to a signal category selected from among a transmitted signal and a received signal; analyzing said signal to determine said signal category; when said signal category of said signal is determined to correspond to said transmitted signal, storing said signal in a first buffer having a first plurality of channels; when said signal category of said signal is determined to correspond to said received signal, saving said signal in a second buffer having a second plurality of channels; when a user submits a request at a first phone, selecting a channel from among said first plurality of channels when said signal corresponds to said transmitted signal or selecting a channel from among said second plurality of channels when said signal corresponds to said received signal; constructing a data message corresponding to said selected channel of said signal in a preselected format, and sending said data message to a second phone; and dividing a display unit of said second phone into a first portion and a second portion, displaying said data message in said first portion when said signal corresponds to said transmitted signal, showing said data message in said second portion when said signal corresponds to said received signal.

To achieve these and other objects in accordance with the principles of the present invention, as embodied and broadly described, the present invention provides a communications apparatus, comprising a trunk receiving a first signal from a central office; a first central processing unit being coupled to said trunk, generating a second signal in accordance with first data included in said first signal, and transmitting said second signal; a second central processing unit being connected to said first central processing unit, receiving said second signal, generating a display message having primary data and secondary data, said display message being generated in accordance with second data included in said second signal, and transmitting said display message; at least one telephone being connected to said second central processing unit sending and receiving data in accordance with requests of users; a display unit being installed on said at least one telephone; and a third central processing unit being coupled to said at least one telephone, receiving said display message, and displaying said primary data of said display message on said display unit in accordance with said secondary data of said display message.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

A private exchange system refers to a small exchange for switching a plurality of extension terminals within the same building or the same office, including a key phone system, a private branch exchange (PBX), and a private branch automatic exchange (PBAX).

In such a private exchange system, a central office (CO) line is connected to a digital trunk to which a digital line signal is applied. In many cases, the digital line signal should be monitored in the private exchange system.

Figure 1:
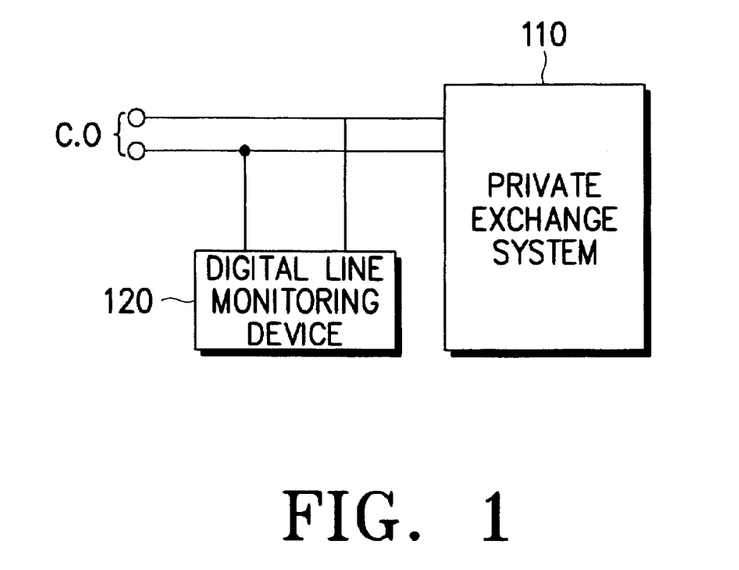
FIG. 1 illustratively shows a digital line signal monitoring method.
Figure 2:
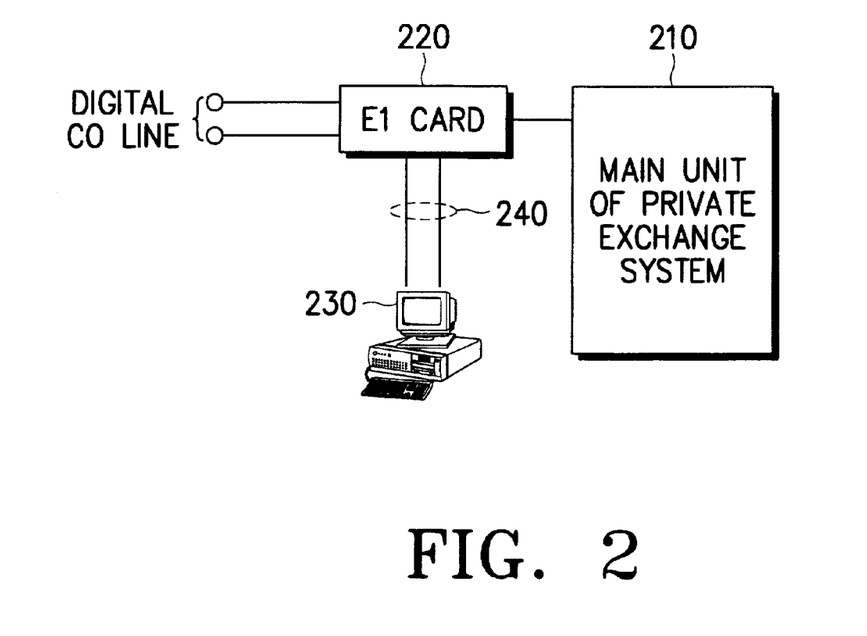
FIG. 2 illustratively shows another digital line signal monitoring method.

FIGS. 1 and 2 show two methods of monitoring a digital line signal. One method is illustratively embodied in FIG. 1. Referring to FIG. 1, a digital line signal is monitored by use of a digital line monitoring device 120 connected to a central office (CO) line leading to a digital trunk (not shown) of a private exchange system 110. Despite the advantage of accurate monitoring of the digital line signal, this method has the shortcoming that an expensive digital line monitoring device is needed.

The other method is illustratively embodied in FIG. 2. Referring to FIG. 2, a central processing unit (CPU) of a digital trunk card (E1 card) 220 in a private exchange system monitors a line signal fed through a digital central office line and applies the monitored line signal data to a personal computer (PC) 230 through an input/output port (RS-232) 240 being a serial port. Then, the personal computer 230 checks the line signal data. A problem with this method is that the private exchange system requires the input/output interface and the personal computer.

A preferred embodiment of the present invention will be described in detail with reference to the attached drawings. The following description of the present invention is conducted with the understanding that a private exchange system refers to a key phone system and the key phone system uses an extension telephone (key phone: K/P phone) with an liquid crystal display (LCD).

Figure 3:
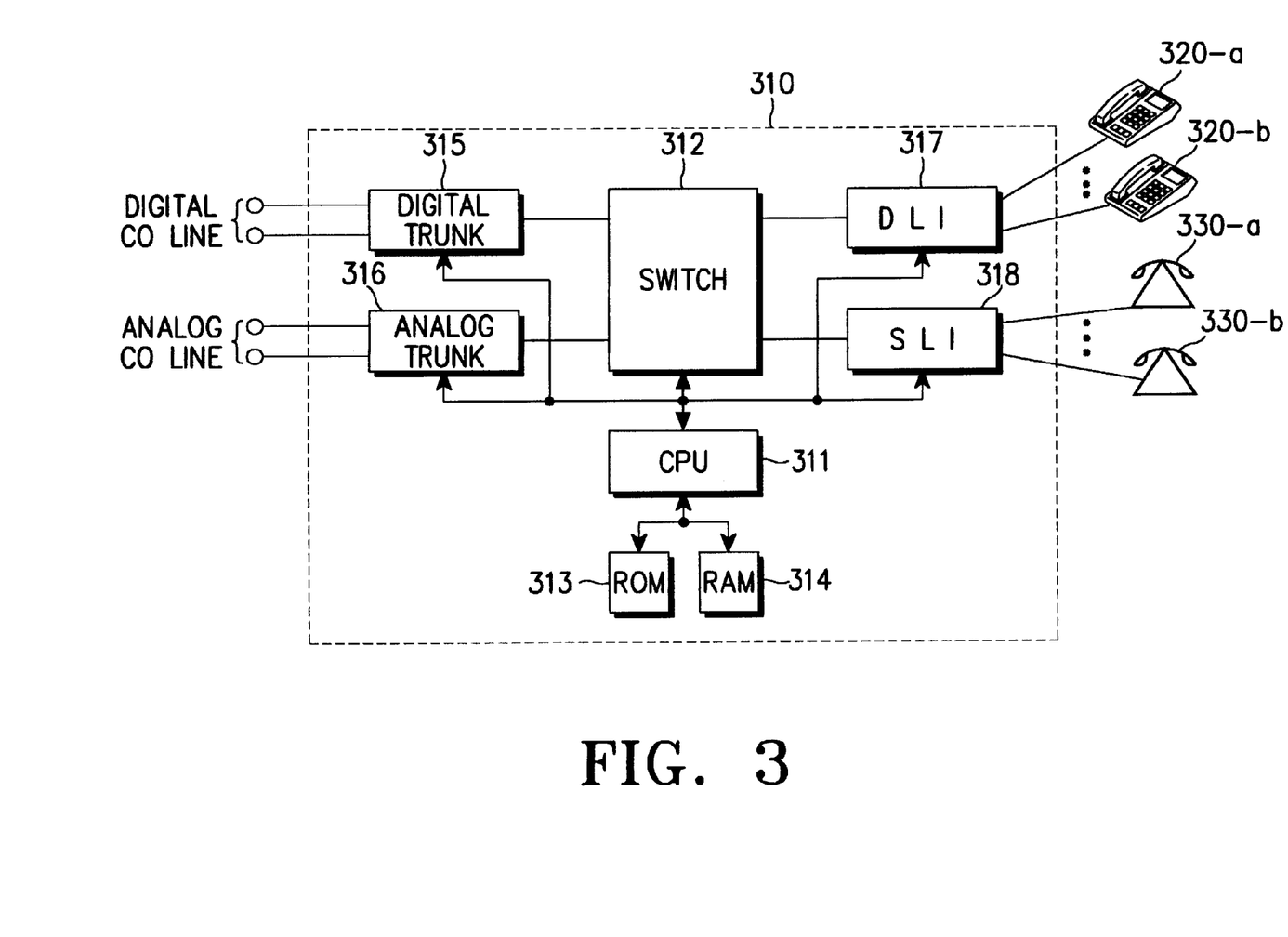
FIG. 3 is a block diagram of a private exchange system, in accordance with the principles of the present invention.

FIG. 3 is a block diagram of a key phone system to which the present invention is applied. Referring to FIG. 3, a central processing unit 311 provides an overall control to a main unit 310 of a key phone system by means of a control program. A switch 312 switches each block in the main unit 310 under the control of the central processing unit 311. A read only memory (ROM) 313 is used to define a system operation mode, and a random access memory (RAM) 314 stores information generated during a system operation. A digital trunk 315 interfaces signals including a digital line signal between a digital central office line and the switch 312 under the control of the central processing unit 311. An analog trunk 316 interfaces signals between an analog central office line and the switch 312 under the control of the central processing unit 311. A digital line interface (DLI) 317 interfaces with key phones 320-a and 320-b and accommodates predetermined ports for extension calls in the key phone system A subscriber line interface (SLI) 318 interfaces with general phones 330-a and 330-b and converts pulse code modulation (PCM) data received from the switch 312 to analog data and analog data received from the general telephones 330-a and 330-b to pulse code modulation data.

Figure 4:
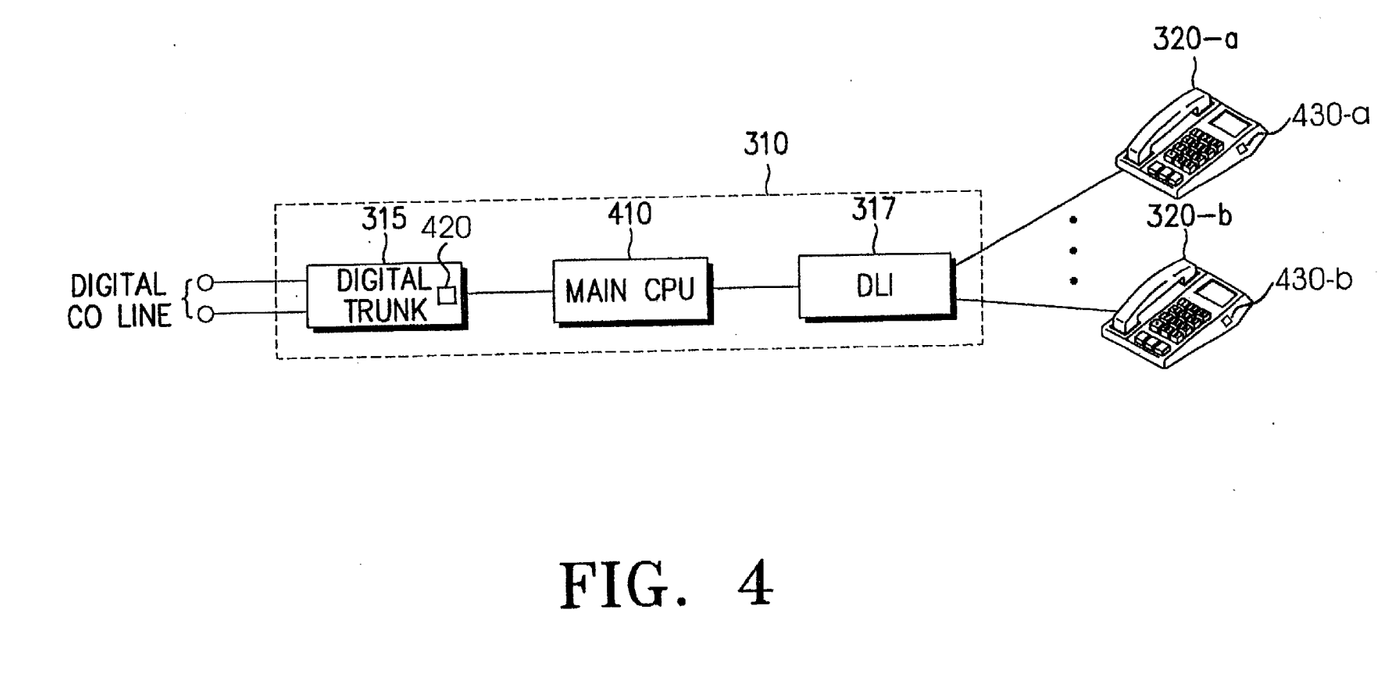
FIG. 4 shows a digital line signal monitoring method, in accordance with the principles of the present invention.

FIG. 4 is a block diagram of a digital line signal monitoring device according to an embodiment of the present invention. The digital line signal monitoring device is comprised of the main unit 310 which includes the digital trunk 315 with a central processing unit (CPU) 420, a main central processing unit (CPU) 410, and the digital line interface 317, and the key phones 320-a and 320-b connected to the digital line interface 317. The key phone 320-a has a central processing unit 430-a. The key phone 320-b has a central processing unit 430-b. The central processing unit 420 of the digital trunk 315 shall be referred to as the digital trunk central processing unit 420. The digital trunk central processing unit 420 communicates with the main central processing unit 410. The term inter-processor communication (IPC) corresponds to communication between central processing units.

To implement the present invention, the main unit 310 should be provided with a storing means having a memory table in which data indicative of the status of a line signal is stored, and the main central processing unit 410 detects the current status of the line signal, reads its corresponding data from the storing means, and feeds the data to a key phone.

A key phone system as shown in FIG. 4 is so configured that a main central processing unit 410 sends visual data representing an operation status to a key phone and the key phone simply displays the visual data.

Figure 5:
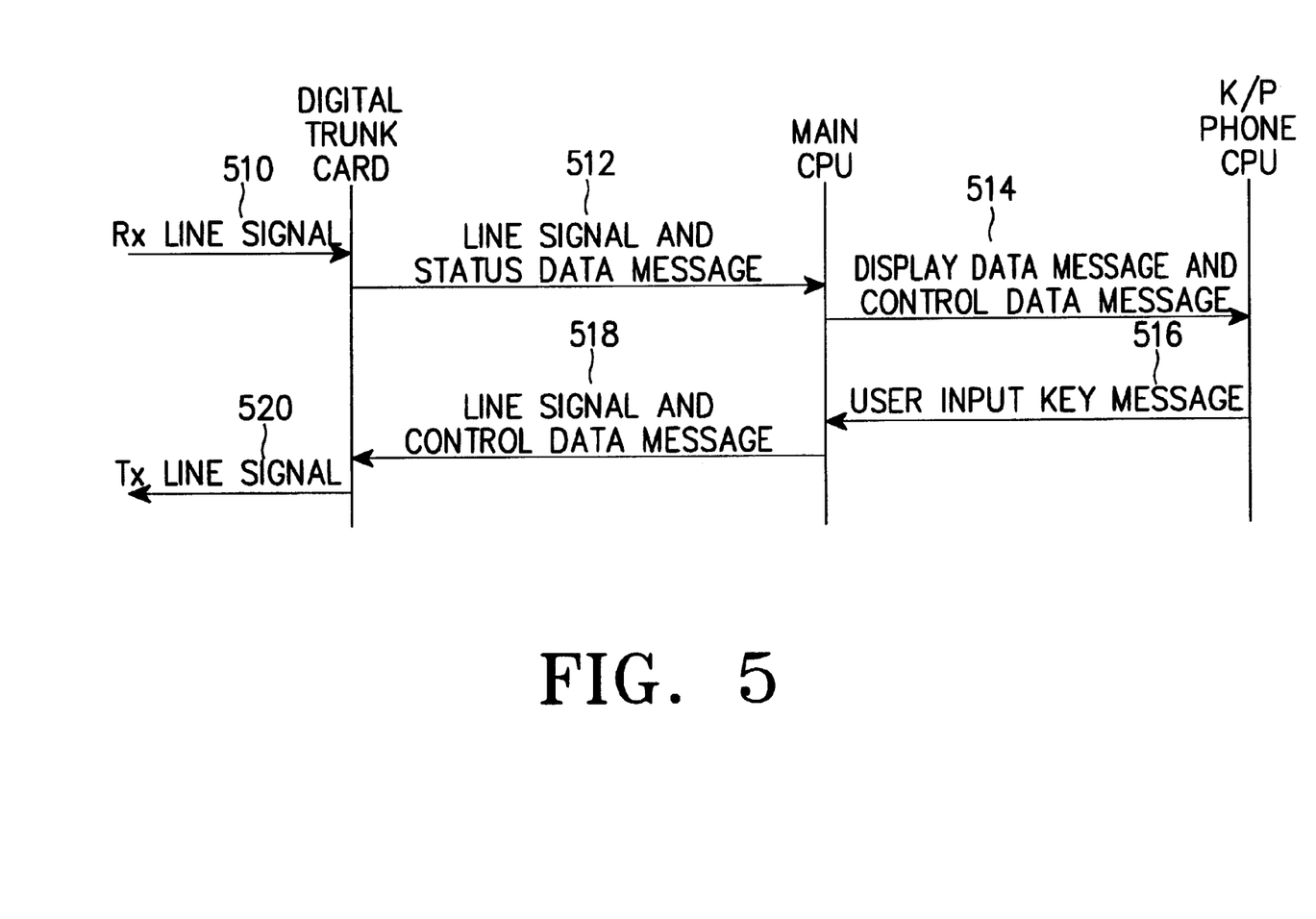
FIG. 5 shows a data flow in the private exchange system of FIG. 3.

A signal flow between the blocks of FIG. 4 is illustrated in FIG. 5. Referring to FIG. 5, at step 510, an Rx line signal is received through a central office line. At step 512, upon reception of the Rx line signal, the digital trunk central processing unit 420 generates a line signal and a status data message. At step 514, the main central processing unit 410 converts the line signal and the status data message to a display data message or a control data message which is fed to a key phone central processing unit (430-a or 430-b, for example). At step 516, a user message generated by the key phone central processing unit (430-a or 430-b) is applied to the main central processing unit 410. Then, at step 518, the main central processing unit 410 generates a line signal and a control data message. At step 520, the digital trunk central processing unit 420 sends a Tx line signal through the central office line.

In application of the above operation for monitoring a digital line signal, the digital trunk central processing unit 420 sends the main central processing unit 410 a status data message representing the status of an Rx line signal received through the central office line or a Tx line signal which the digital trunk central processing unit 420 sends, by inter-processor communication (IPC). The main central processing unit 410 constructs a display data message from the status data message and sends it to a key phone. The key phone central processing unit (430-a or 430-b) displays the display data message on its liquid crystal display (LCD) to allow the line signal to be monitored. As aforementioned, message transmission and control are performed by inter-processor communication (IPC) between the digital trunk central processing unit 420 and the main central processing unit 410 and between the main central processing unit 410 and the key phone central processing unit (430-a or 430-b).

Figure 6:
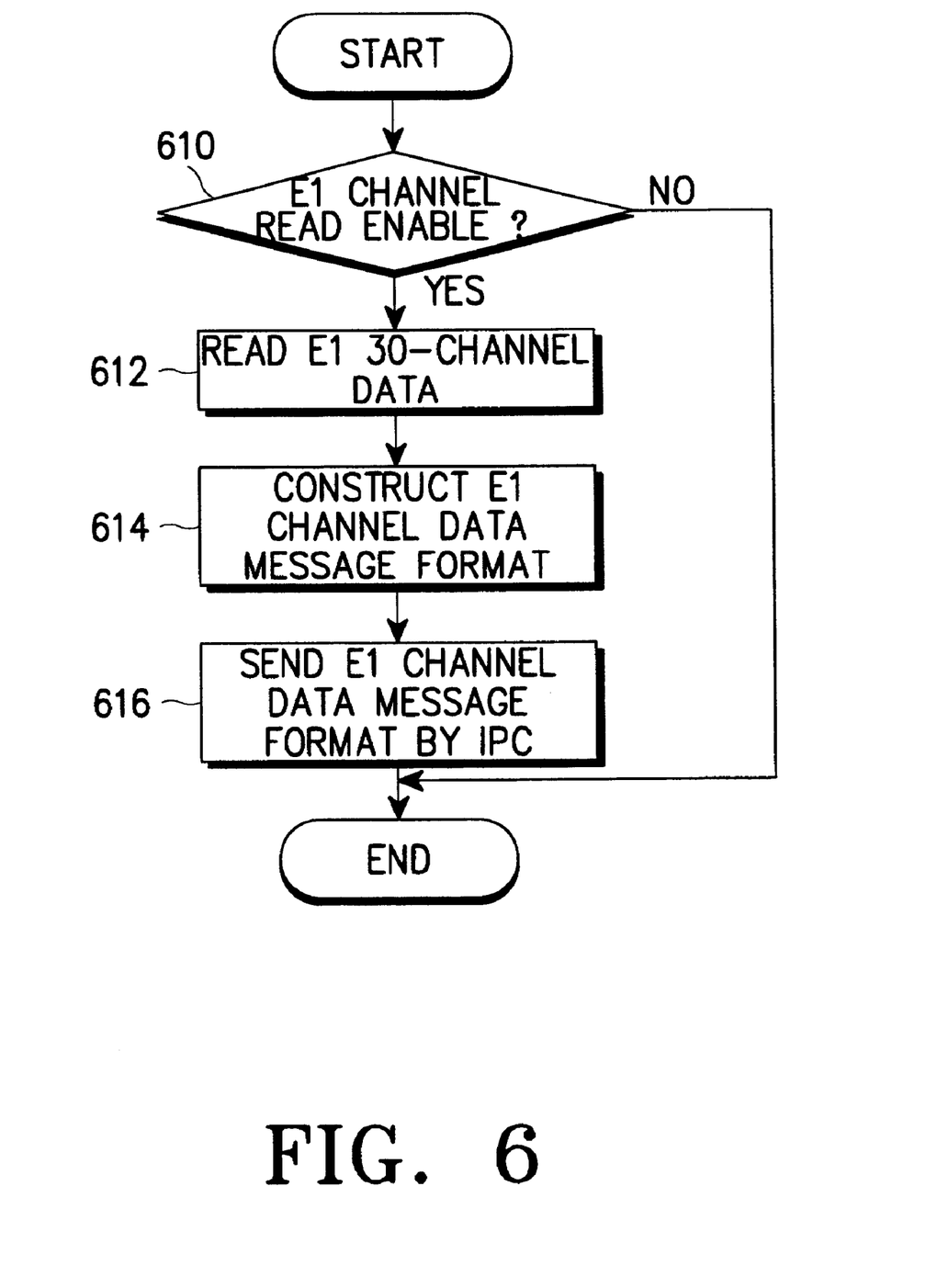
FIG. 6 is a flowchart depicting a digital line signal monitoring process in a digital trunk shown in FIG. 4, in accordance with the principles of the present invention.

FIG. 6 is a flowchart depicting a digital line signal monitoring procedure in the digital trunk 315 of FIG. 4. Upon application of a channel read enable signal, a channel data message is constructed by reading channel data of a line signal. Then the channel data message is sent by inter-processor communication (IPC). Thus, the channel data message is sent from the digital trunk central processing unit 420 to the main central processing unit 410.

Figure 7:
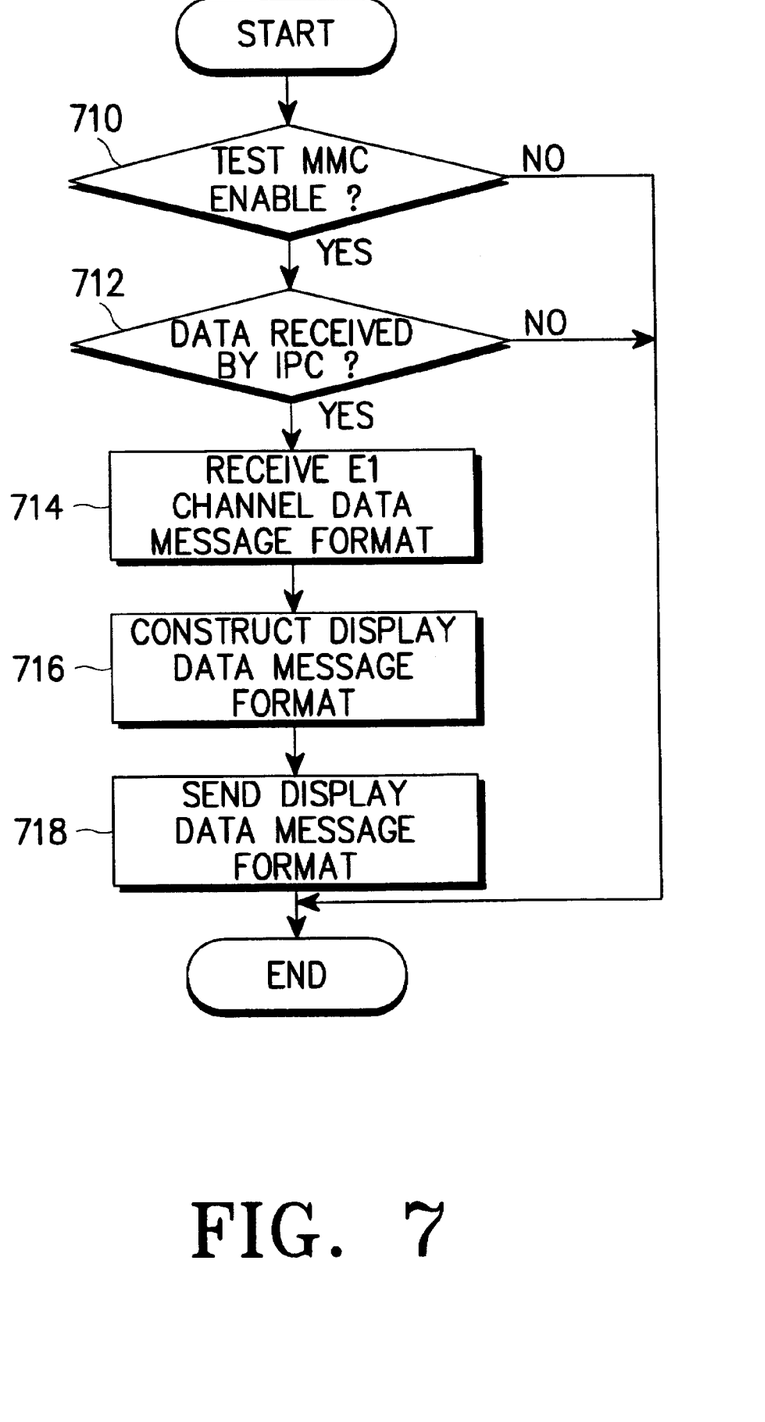
FIG. 7 is a flowchart depicting a digital line signal monitoring process in a central processing unit shown in FIG. 4, in accordance with the principles of the present invention.

FIG. 7 is a flowchart depicting a digital line signal monitoring procedure in the main central processing unit 410 of FIG. 4. The main central processing unit 410 receives the channel data message by inter-processor communication (IPC), constructs a display data message from the received channel data message, and sends the display data message.

Before presenting a more detailed description of the embodiment of the present invention, it is to be appreciated that a typical digital trunk for use in a key phone system is E1, T1, or PRI. The digital trunk 315 herein is assumed to be E1.

The term E1 denotes a transmission rate of 2.048 megabits per second (Mb/s). The term T1 denotes a transmission rate of 1.544 megabits per second. The term PRI corresponds to "primary rate interface" which is a type of integrated services digital network (ISDN) connection. In North America and Japan, the PRI can consist of 24 channels, usually divided into 23 B channels and 1 D channel, and runs over the same physical interface as T1.

Elsewhere, the PRI has 31 user channels, usually divided into 30 B channels and 1 D channel and is based on the E1 interface. PRI is typically used for connections such as one between a private branch exchange (PBX) and a central office (CO) or an inter exchange carrier (IXC). An inter exchange carrier can be a long distance telephone company.

A line signal is defined as follows based on the Korean Telecommunications Technology Association (TTA) standard and International Telecommunications Union-Telecommunication Sector (ITU-T) standard.

TABLE 1

| | signal sign | | | |
|---|---|---|---|---|
| | forward | | backward | |
| line status | af | bf | ab | bb |
| idle | 1 | 0 | 1 | 0 |
| seizure | 0 | 0 | 1 | 0 |
| seizure acknowledge | 0 | 0 | 1 | 1 |
| answer | 0 | 0 | 0 | 1 |
| clear backward | 0 | 0 | 1 | 1 |
| clear forward | 1 | 0 | 0 | 1 |
| | | | 1 | 1 |
| release guard | 1 | 0 | 1 | 0 |
| block | 1 | 0 | 1 | 1 |

In Table 1 above, only the bits A and B of the ABCD line signal of the E1 trunk are presented, though the ABCD line signal is comprised of ABCD bits. The line signal can be expressed in ABCD bits and a hexadecimal digit as shown below in Table 2.

TABLE 2

| | signal sign | | | | | | | | | |
|---|---|---|---|---|---|---|---|---|---|---|
| | forward af bf cf df | | | | | backward ab bb cb db | | | | |
| line status | | | | | hex | | | | | hex |
| idle | 1 | 0 | 0 | 1 | 9 | 1 | 0 | 0 | 1 | 9 |
| seizure | 0 | 0 | 0 | 1 | 1 | 1 | 0 | 0 | 1 | 9 |
| seizure acknowledge | 0 | 0 | 0 | 1 | 1 | 1 | 1 | 0 | 1 | D |
| answer | 0 | 0 | 0 | 1 | 1 | 0 | 1 | 0 | 1 | 5 |
| clear backward | 0 | 0 | 0 | 1 | 1 | 1 | 1 | 0 | 1 | d |
| clear forward | 1 | 0 | 0 | 1 | 9 | 1 | 1 | 0 | 1 | D |
| release guard | 1 | 0 | 0 | 1 | 9 | 1 | 0 | 0 | 1 | 9 |
| block | 1 | 0 | 0 | 1 | 9 | 1 | 1 | 0 | 1 | D |

In accordance with Tables 1 and 2, the statuses of the line signal can be idle, seizure, seizure acknowledge, answer, clear backward, clear forward, release guard, or block, for example. Table 2 shows line signal data of an Rx line signal and a Tx line signal received and transmitted through an E1 trunk interface by the E1 trunk central processing unit 420 of the E1 trunk 315. The E1 trunk 315 forms a status data message from line signal data and sends it to the main central processing unit 410. This operation will be described in detail with reference to FIG. 6.

In FIG. 6, the E1 trunk central processing unit 420 determines whether an E1 channel read enable signal has been received in step 610. If it has been, data of 30 channels among E1 channels is read in step 612. Then, an E1 channel data message is constructed in step 614 and sent to the main central processing unit 410 by inter-processor communication (IPC) in step 616. An example of the E1 channel data message sent to the main central processing unit 410 is given in Table 3.

TABLE 3

| MSG HEADER | PORT | LENGTH | Rx/Tx | CH IDENTIFICATION | CH1 DATA | CH2 DATA | ... | CH(N-1) DATA | CH N DATA |
|---|---|---|---|---|---|---|---|---|---|

In Table 3, MSG HEADER indicates a message type, PORT is the number of an E1 trunk card, LENGTH is the length of the message, Rx/Tx indicates whether the message represent an Rx or Tx line signal data, and CH SET identifies channels whose data follows the field in the case where the amount of 30-channel data is too large to be loaded in a single channel data message and thus is divided into a plurality of segments for transmission. Line signal data sent from the E1 trunk 315 to the main central processing unit 410 is 10 to 50 milliseconds (msec) in duration and determined not to influence a central processing unit load of the E1 trunk 315.

Then, there will be a description of an operation for the main central processing unit 410 to send a display data message to a key phone referring to FIG. 7.

At step 710, the main central processing unit 410 determines whether a test man-machine communication (MMC) enable signal has been received. At step 712, if it has, the main central processing unit 410 determines whether E1 data has been received by inter-processor communication (IPC). At step 714, upon reception of the E1 data, the main central processing unit 410 receives an E1 channel data message from the E1 trunk 315. Then, at step 716, the main central processing unit 410 constructs a display data message and sends it to the key phone 320-a or 320-b in step 718. That is, the main central processing unit 410 sends the line signal data received from the E1 trunk 315 to the key phone through formatting or without any processing. For example, if the key phone displays the display data message in two rows each row having 16 digits, a display data message can be constructed as shown in Table 4.

TABLE 4

| MSG HEADER | PORT | LENGTH | UPPER/ LOWER | LINE SIGNAL DATA 1 | LINE SIGNAL DATA 2 | LINE SIGNAL DATA 3 | ... | LINE SIGNAL DATA N | LINE SIGNAL DATA (N+1) |
|---|---|---|---|---|---|---|---|---|---|

In Table 4, MSG HEADER indicates a message type, PORT is the number of a key phone, LENGTH is the length of the message, UPPER/LOWER indicates whether the message is to be displayed in an upper portion or a lower portion of a liquid crystal display (LCD), and LINE SIGNAL DATA 1 is a field set to R or T indicating Rx data or Tx data. From LINE SIGNAL DATA 2 to LINE SIGNAL (N+1) are sequentially loaded the line signal data of channel 1 to the line signal data of channel N.

Upon reception of the above display data message from the main central processing unit 410, a key phone central processing unit (430-a or 430-b) displays the line signal data of 15 channels with R or T in an upper or lower portion of its liquid crystal display (LCD) based on the contents of the message.

Figure 8:
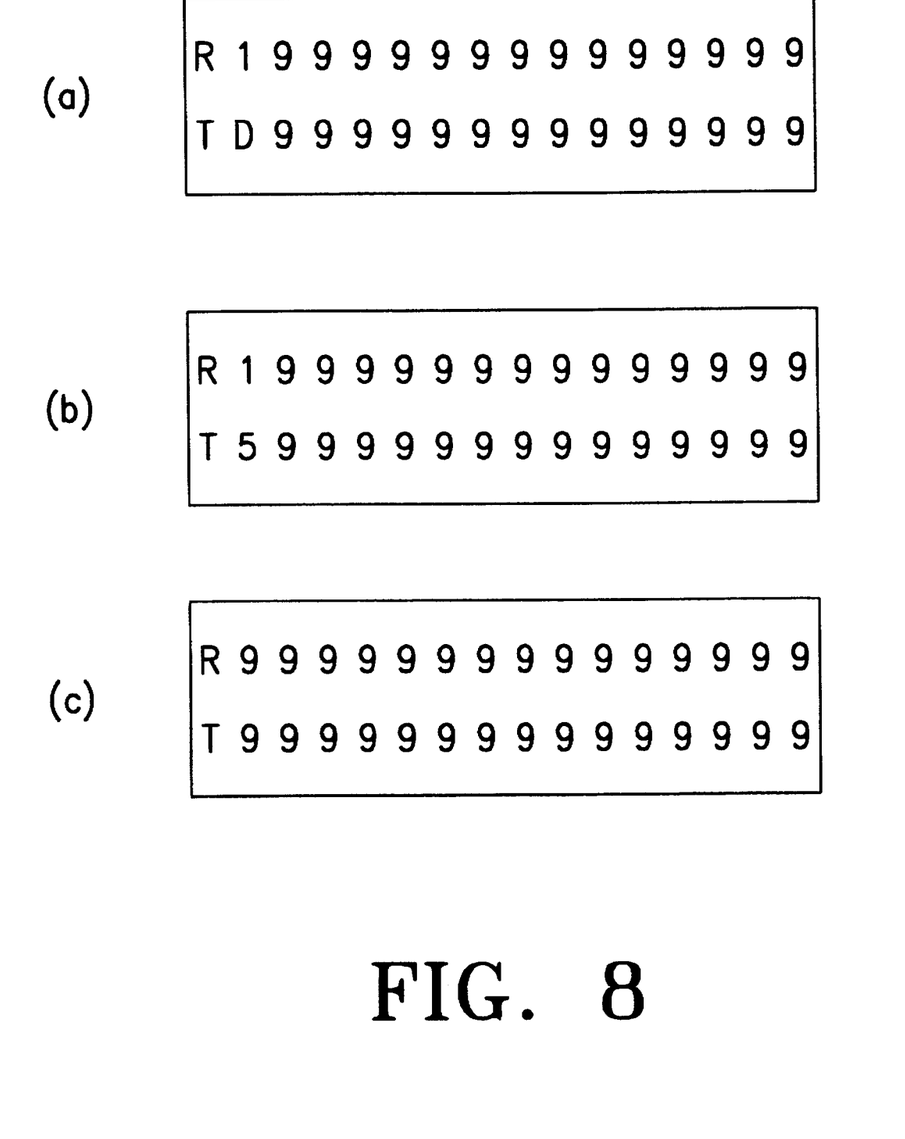
FIG. 8 shows line signal statuses displayed in a key phone, in accordance with the principles of the present invention.

With reference to Table 2, an actual display of a line signal in a key phone will be described. For example, if the statuses of both Rx and Tx lines signals in the E1 trunk are idle, ABCD bits (HEX) are 1001(9) in Table 2, which is displayed on a key phone liquid crystal display through a series of procedures as shown in FIG. 8C. "R999999999999999" of FIG. 8C represents ch1 to ch15 of an Rx line signal, and "T999999999999999" of FIG. 8C represents ch1 to ch15 of a Tx line signal. Ch0 in E1 channels is a synchronization data and ch16 is used for line signal data. 30 channels ch1 to ch15 and ch17 to ch31 among the total 32 channels are virtually used as pulse code modulation (PCM) channels. Therefore, there is no need for monitoring ch0 and ch16 but the two channels can be used for a message to be monitored.

For data displays shown in FIGS. 8A to 8C, the main central processing unit 410 receives data of 32 channels from the E1 trunk central processing unit 420 and stores them in buffers so that the first 15 channels or the last 15 channels can be displayed according to user manipulation. Table 5 and Table 6 respectively show an Rx line signal data buffer and a Tx line signal data buffer provided in the main central processing unit 410.

TABLE 5

| CH 0 | CH 1 | CH2 | CH3 | ... | ... | ... | CH 30 | CH 31 | CH32 |
|---|---|---|---|---|---|---|---|---|---|

TABLE 6

| CH 0 | CH 1 | CH2 | CH3 | ... | ... | ... | CH 30 | CH 31 | CH32 |
|---|---|---|---|---|---|---|---|---|---|

In another embodiment, intended data may be displayed on an liquid crystal display of a key phone by use of another key phone. For example, if a user enters digit 1 using a man-machine communication (MMC) function generally employed in a key phone system, Rx and Tx data of ch1 to ch15 in the respective buffers are displayed. Upon entry of digit 2, Rx and Tx data of ch17 to ch31 in the respective buffers are displayed. Upon entry of digit 3, Rx data representing ch1 to ch15 and Rx data representing ch17 to ch31 in the Rx line signal data buffer are displayed in an upper portion and a lower portion of the liquid crystal display, respectively. Upon entry of digit 4, Tx data representing ch1 to ch15 and Tx data representing ch17 to ch31 in the Tx line signal data buffer are displayed in an upper portion and a lower portion of the liquid crystal display, respectively. This is an example. Therefore, data can be displayed in as various ways as the user intends. To implement the above embodiment, two key phones are required, one for a man-machine communication (MMC) function and the other for display of a line signal.

FIGS. 8A, 8B, and 8C exemplarily show data displays on a liquid crystal display of a key phone. The data of FIG. 8A indicates that ch1 of an E1 trunk is occupied by a calling party (forward: seizure 0001) and a called party acknowledges the channel occupation (backward: seizure acknowledge 1101). This data is displayed by the called party. Here, R represents an Rx line signal, 1 following R means seizure, T represents a Tx line signal and 1 following T means seizure acknowledge, referring to Table 2.

The data of FIG. 8B indicates that ch1 of an E1 trunk is occupied by a calling party (forward: seizure 0001) and a called party acknowledges the channel occupation (backward: seizure acknowledge 1101) and then answers (answer 0101) after dialing. This data is displayed by the called-party. Here, R represents an Rx line signal, 1 following R means seizure, T represents a Tx line signal and 5 following T means answer, referring to Table 2.

The data of FIG. 8C indicates that both forward and backward ch1 statuses are idle. Here, R represents an Rx line signal, 9 following R means idle, T represents a Tx line signal and 9 following T also means idle, referring to Table 2.

As described above, a digital line signal monitoring method of the present invention obviates the need for an expensive digital line signal monitoring device or a separately procured device, thereby saving installation cost and reducing installation time.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method, comprising:
    monitoring digital signals using a key phone in a private exchange communication system, comprising:
        receiving a first digital signal at said private exchange communication system;
        when said first signal is received, constructing a second signal according to a predetermined format and then transmitting said second signal by inter-processor communication;
        outputting a data message to said key phone, said data message corresponding to said second signal; and
        displaying said data message on a display unit of said key phone, said data message including an identification number of said key phone, a size of said data message, first data to be displayed on said display unit, and second data corresponding to said second signal, wherein a status of said second signal is selected from the group consisting of idle, seizure, seizure acknowledge, answer, clear backward, clear forward, release guard, and block.

2. The method of claim 1, said displaying further comprising:
    receiving said data message and analyzing said first data;
    dividing said display unit into a first portion and a second portion;
    determining whether to use said first portion or said second portion or both portions, in accordance with said analyzing of said first data;
    displaying said second data on said determined portion of said display unit.

3. The method of claim 1, further comprising said first digital signal being received at a digital trunk of said private exchange communication system.

4. The method of claim 1, further comprising said first signal corresponding to a request to enable a digital channel.

5. The method of claim 1, further comprising:
    said transmitting of said second signal by said inter-processor communication corresponding to a transmission of said second signal from a first central processing unit to a second central processing unit, said receiving and constructing and transmitting being controlled by said first central processing unit; and
    said outputting being performed by said second central processing unit.

6. The method of claim 5, said displaying further comprising:
    receiving said data message and analyzing said first data;
    dividing said display unit into a first portion and a second portion;
    determining whether to use said first portion or said second portion or both portions, in accordance with said analyzing of said first data;
    displaying said second data on said determined portion of said display unit.

7. A communications apparatus, comprising:
    a trunk receiving a first signal from a central office;
    a first central processing unit being coupled to said trunk, generating a second signal in accordance with first data included in said first signal, and transmitting said second signal;
    a second central processing unit being connected to said first central processing unit, receiving said second signal, generating a display message having primary data and secondary data, said display message being generated in accordance with second data included in said second signal, and transmitting said display message;
    at least one telephone being connected to said second central processing unit sending and receiving data in accordance with requests of users;
    a display unit being installed on said at least one telephone; and
    a third central processing unit being coupled to said at least one telephone, receiving said display message, and displaying said primary data of said display message on said display unit in accordance with said secondary data of said display message, said second signal having a predetermined format including at least one selected from among a digital trunk number, a message length, data corresponding to said signal category, channel identifying data, and channel data corresponding to said signal.

8. The apparatus of claim 7, wherein a status of said second signal corresponds to at least one selected from among idle, seizure, seizure acknowledge, answer, clear backward, clear forward, release guard, and block.

9. The apparatus of claim 8, further comprising said trunk corresponding to a communications link between said central office and said second central processing unit.

10. The apparatus of claim 9, further comprising:
    a digital line interface connecting said second central processing unit with said at least one telephone; and
    a plurality of additional telephones being connected to said digital line interface and sending and receiving data in accordance with requests of users.

11. A method of monitoring a signal using a phone in a private exchange system, comprising:
    sending by inter-processor communication a signal constructed in a predetermined format in response to a digital channel enable request;

receiving said signal by inter-processor communication, said signal corresponding to a signal category selected from among a transmitted signal and a received signal;

analyzing said signal to determine said signal category;

when said signal category of said signal is determined to correspond to said transmitted signal, storing said signal in a first buffer having a first plurality of channels;

when said signal category of said signal is determined to correspond to said received signal, saving said signal in a second buffer having a second plurality of channels;

when a user submits a request at a first phone, selecting a channel from among said first plurality of channels when said signal corresponds to said transmitted signal or selecting a channel from among said second plurality of channels when said signal corresponds to said received signal;

constructing a data message corresponding to said selected channel of said signal in a preselected format, and sending said data message to a second phone; and dividing a display unit of said second phone into a first portion and a second portion, displaying said data message in said first portion when said signal corresponds to said transmitted signal, showing said data message in said second portion when said signal corresponds to said received signal, said predetermined format including a digital trunk number, a message length, data corresponding to said signal category, channel identifying data, and channel data corresponding to said signal.

12. The method of claim 11, said analyzing and storing and saving further comprising:

analyzing said data corresponding signal category, said channel identifying data, and said channel data;

when said signal category data corresponds to said transmitted signal, storing said channel data in predetermined channels of said first buffer in accordance with said channel identifying data; and when said signal category data corresponds to said received signal, saving said channel data in predetermined channels of said second buffer in accordance with said channel identifying data.

13. The method of claim 11, said selecting and constructing further comprising:

receiving said request submitted at said first phone by the user;

reading said channel data of a predetermined channel stored in said first buffer or reading said channel data of a predetermined channel saved in said second buffer, in accordance with said request; and constructing said read channel data as said display message in said preselected format and sending said display message to said second phone.

14. The method of claim 13, further comprising said display message including an identification number of said second phone, a size of said data message, first data to be displayed on said display unit, and second data corresponding to said signal.

15. The method of claim 14, said dividing and displaying and showing further comprising:

analyzing said first data to be displayed on said display unit and analyzing said second data corresponding to said signal;

identifying an area of said display unit on which to display said first data, in response to said analysis of said first data;

identifying said signal category based on data recorded in a first channel of said second data; and displaying said display message on said identified area of said display unit in accordance with said identification of said signal category based on the data recorded in said first channel of said second data.

16. The method of claim 14, said dividing and displaying and showing further comprising:

analyzing said first data to be displayed on said display unit and analyzing said second data corresponding to said signal;

identifying an area of said display unit on which to display said first data, in response to said analysis of said first data;

identifying said signal category based on data recorded in a first channel of said second data;

when said signal category is identified as being said transmitted signal based on the data recorded in said first channel of said second data, displaying said display message on said identified area of said display unit in said first portion; and when said signal category is identified as being said received signal based on the data recorded in said first channel of said second data, showing said display message on said identified area of said display unit in said second portion.

17. The method of claim 16, further comprising:

said sending of said signal by said inter-processor communication being performed by a first central processing unit installed at a digital trunk of a private exchange communications system, said digital trunk being connected to a central office;

said receiving of said signal by said inter-processor communication being performed by a second central processing unit installed at said private exchange communications system, said second central processing unit being connected to said first central processing unit;

said first phone being connected to said second central processing unit and having a third central processing unit installed therein accepting said request submitted by the user; and said second phone being connected to said second central processing unit and having a fourth central processing unit installed therein receiving said data message and displaying said data message on said display unit.

18. The method of claim 17, further comprising a digital line interface connecting said first and second phones with said second central processing unit.

19. A method of monitoring a signal using a phone in a private exchange system, the method comprising:

sending by inter-processor communication a signal constructed in a predetermined format in response to a digital channel enable request;

receiving said signal by inter-processor communication, said signal corresponding to a signal category selected from among a transmitted signal and a received signal;

analyzing said signal to determine said signal category;

when said signal category of said signal is determined to correspond to said transmitted signal, storing said signal in a first buffer having a first plurality of channels;

when said signal category of said signal is determined to correspond to said received signal, saving said signal in a second buffer having a second plurality of channels;

when a request is submitted at a first phone, selecting a channel from among said first plurality of channels when said signal corresponds to said transmitted signal or selecting a channel from among said second plurality of channels when said signal corresponds to said received signal;

constructing a data message corresponding to said selected channel of said signal in a preselected format, and sending said data message to a second phone; and displaying said data message on a display unit of said second phone when said signal corresponds to said transmitted signal, showing said data message on said display unit when said signal corresponds to said received signal, said predetermined format including at least one selected from among a digital trunk number, a message length, data corresponding to said signal category, channel identifying data, and channel data corresponding to said signal.

20. The method of claim 19, further comprising said channel selected from among said first plurality of channels corresponding to a predetermined channel.

21. The method of claim 19, said data message including at least one selected from among an identification number of said second phone, a size of said data message, first data to be displayed on said display unit, and second data corresponding to said signal.

* * * * *